United States Patent Office 3,386,934
Patented June 4, 1968

3,386,934
PAINTS COMPRISING ALUMINUM OXIDE THAT CONTAINS LESS THAN 30% ALPHA ALUMINA
Leon Aguadisch, Sevres, Jacques Charrier, La Courneuve, and Claude Miguet, Paris, France, assignors to Produits Chimiques Pechiney-Saint-Gobain, Neuilly-sur-Seine, France
No Drawing. Filed June 9, 1965, Ser. No. 462,714
Claims priority, application France, June 15, 1964, 978,325
10 Claims. (Cl. 260—23.7)

ABSTRACT OF THE DISCLOSURE

The invention is addressed to a paint composition formulated of a binder selected from the group consisting of a drying oil or a polymeric material in the form of a homopolymer or copolymer of vinyl acetate, vinyl chloride, vinylidene chloride, acrylic and alkyl acrylic derivatives and styrene-butadiene copolymers, a transition alumina having less than 30% by weight alpha alumina, a specific area within the range of 20 to 250 $m^2/g.$, a microporosity determined by absorption of carbon tetrachloride within the range of 3 to 30 $cm.^3$ of carbon tetrachloride per 100 grams of alumina, and a grain size of less than 65 microns, and in which the alumina particles may be coated with an oleophilic material or a hydrophilic material and which may contain finely divided organic pigments such as titanium dioxide.

This invention relates to paints and particularly to paint compositions formulated with alumina. Generally paints are formulated of pigments such as zinc oxide, lithopone, titanium dioxide and the like, and flatteners or loading agents such as calcium carbonate, mica dust, kaolin, talc, barium sulphate, and the like. These confer the desired physical and mechanical properties for application and use.

Titanium dioxide provides excellent opacity but paints formulated with titanium oxides are characterized by poor abrasion resistance, poor weather resistance, and corrosion. With emulsion paints, which make use of resinous polymers, titanium dioxide cannot be used alone because it is expensive and it is therefore diluted with loading agents or flattening agents.

Calcium carbonate, treated or untreated, precipitated or natural, has low opacifying power, good wear resistance but low weather resistance and calcium carbonate contributes little by way of thixotropy to the paint composition.

Mica dust provides the paint composition with good weather resistance but it otherwise offers little by way of improvement to others of the properties of the paint composition. Kaolin, talc and barium sulphate have a number of drawbacks well known to those skilled in the art.

It is an object of this invention to produce and to provide a method for producing paint compositions which are free of drawbacks of the types previously described and it is a related object to produce and to provide a method for producing oil base or synthetic resinous based paint compositions of the type described, and particularly emulsion paints, which make use of polymers, illustrated by but not limited to polymers and/or copolymers of vinyl derivatives, butadienes and styrene polymers and copolymers.

It has been found that paint compositions having good weather resistance, good abrasion strength and high opacity can be fabricated when such paint compositions are formulated with alumina in a state of transition, having less than 30% by weight alpha alumina and preferably less than 20% by weight alpha alumina, which has a specific area, measured by nitrogen absorption, within the range of 20 to 250 $m.^2/g.$, and a microporosity based upon absorption of carbon tetrachloride within the range of 3 to 30 $cm.^3$ of carbon tetrachloride per 100 grams of alumina, and a grain size which is less than 65 microns and preferably less than 20 microns. For example, excellent results have been secured with an alumina of the type described having a specific area within the range of 30 to 90 $m^2/g.$ and a grain size in which 70–90% of the alumina is less than 10 microns.

The grain size of the alumina selected depends somewhat upon the type of paint composition to be prepared and upon the specific area of the alumina. For example, the fineness of the particles of alumina will be greater for an indoor paint than for an outdoor paint or for an anti-skid paint.

To obtain the opacifying power and wear resistance characteristic of the paint compositions of this invention when use is made of a fine grain size of alumina, one will have to be content with an alumina having a small specific area. With alumina of larger grain size, the described characteristics are secured with the use of alumina having a larger specific area.

In accordance with a further concept of this invention, it is possible to enhance the properties of the alumina used in the paint compositions of this invention by subjecting the particles of alumina to a surface treatment, as by coating the particles with a mineral or organic product which will influence the affinity of the pigment, making the pigment either oleophilic or hydrophilic, as the case may be. Thus it is possible, during fabrication of the pigment, to subject the pigment to a surface treatment with organic acids, such as stearic acid, oleic acid, naphthenic acid, and the like, to render the pigment more oleophilic.

In addition, because of the affinity of amides, amines, and hydroxyl radicals for alumina, beneficial use can be made of binders embodying such radicals as complementary adjuvants.

The alumina can be used alone in the paint composition for imparting color and as the loading agent but it is preferred to make use of alumina in combination with titanium dioxide or other pigment. Because of the high opacity of the alumina, paints which make use of such alumina can be formulated with a lesser proportion of titanium dioxide or other pigments.

When formulated into paint compositions, the alumina embodying the features of this invention operates to produce a paint composition that combines the many desirable properties secured from different loading agents including high opacity, better mechanical properties, higher resistance to wear and abrasion, good weather resistance and whiteness. As for their working characteristics, paints formulated with alumina have excellent thixotropic properties and brushing characteristics. The dried paint film is harder and smoother and provides for good coverage.

The alumina differs from other loading agents or extenders which have heretofore been employed in the formulation of paint compositions in that its low refractive index favors its use as a loading agent or extender while, at the same time, its high opacity permits its use as a pigment.

The alumina employed in the practice of this invention can be formulated into paint compositions of an oil base and/or synthetic resinous base. It can be employed in emulsion paint compositions based upon the use of polymers illustrated but not limited by the following: homopolymers and/or copolymers of derivatives of vinyl acetate, vinyl chloride, vinylidene chloride, acrylic or alkylacrylic derivatives, styrene-butadiene copolymers and the like.

With alumina of the type described, durable paint compositions can be formulated and applied with good results in which pigment volume concentrations (PVC) can be higher than usual and may be employed to levels as high as the critical pigment volume concentration (CPVC).

To determine the properties of paints pigmented with alumina of this invention, paint compositions were prepared in which the pigment volume concentration (PVC) was varied within the range of 20–70%.

In the following examples, given by way of illustration, but not by way of limitation, description is made of paint compositions formulated with specific binders in which the paint composition is formulated to a PVC of 40–60% with one composition formulated with precipitated chalk and another with alumina, as indoor and outdoor paints and in which the total solids of the paint compositions correspond to 55% by weight.

As used herein and in the paint industry, the term "pigment volume concentration (PVC)" is meant to refer to the number of parts by volume of pigment in 100 parts by volume of the mixture of pigment plus dry binder.

The alumina used in the following examples has the following characteristics: the major part is alumina of transition in which 8–10% by weight is in the alpha phase, as determined by X-ray examination; the specific surface (BET) is 70 m.$^2$/g.; the volume of micropores of less than .1 micron is 11.4 cm.$^3$/100 g.; the average grain size is analyzed as follows:

Microns (amount greater than): percent
65 ---------------------------------------- 0
20 ---------------------------------------- 0.25
10 ---------------------------------------- 11.5

In the above, the term "BET surface" is measured by nitrogen absorption in accordance with the method of S. Brunauer, P. H. Emmett and E. Teller, Journal of the American Chemical Society, Vol. 30 (1938), page 309 and following.

The micropore ratio is measured by the number of cm.$^3$ of carbon tetrachloride absorbed by 100 grams of alumina over a period of 2 hours at 20° C. in a saturated atmosphere.

EXAMPLE 1.—FORMULAS WITH A DISPERSION OF VINYL ACETATE-MALEIC ESTER COPOLYMERS

| | PVC 40% | | PVC 60% | |
| | Paint | | Paint | |
| | $CO_3Ca$ | $Al_2O_3$ | $CO_3Ca$ | $Al_2O_3$ |
|---|---|---|---|---|
| Rutile titanium oxide | 22 | 19.5 | 15 | 12 |
| Precipitated chalk, grain size 10μ | 14 | --------- | 28.5 | --------- |
| Alumina (above mentioned characteristics) | --------- | 18.5 | --------- | 34 |
| Dispersion with 55% dry extract | 37 | 33 | 22.5 | 18 |
| Adjuvants | 27 | 29 | 34 | 36 |
| | 100.00 | 100.00 | 100.00 | 100.00 |
| Ratio by weight of pigment to binder | 1.85 | 2.2 | 3.66 | 4.89 |
| Adjuvants details: | | | | |
| Tripolyphosphate 10% | 1.95 | 1.74 | 2.10 | 1.64 |
| $NH_4OH$ 20% | 0.15 | 0.14 | 0.09 | 0.07 |
| Bactericidal based on mercury | 0.65 | 0.57 | 0.55 | 0.42 |
| Hexylene glycol | 0.75 | 0.70 | 0.92 | 0.70 |
| Sodium carboxymethyl cellulose 3% solution | 19.50 | 17.70 | 19.90 | 23.88 |
| Water | 4.00 | 8.15 | 10.45 | 9.29 |
| Total | 27.00 | 29.00 | 34.00 | 36.00 |

EXAMPLE 2.—FORMULAS WITH A DISPERSION OF VINYL ACETATE-ACRYLIC ESTER COPOLYMERS

| | PVC 40% | | PVC 60% | |
| | Paint | | Paint | |
| | $CO_3Ca$ | $Al_2O_3$ | $CO_3Ca$ | $Al_2O_3$ |
|---|---|---|---|---|
| Rutile titanium oxide | 22 | 19.5 | 15 | 12 |
| Precipitated chalk, grain size 10μ | 14 | --------- | 28.5 | --------- |
| Alumina (above mentioned characteristics) | --------- | 18.5 | --------- | 34 |
| Dispersion with 55% dry extract | 35 | 31 | 21.5 | 17 |
| Adjuvants | 29 | 31 | 35 | 37 |
| | 100.00 | 100.00 | 100.00 | 100.00 |
| Ratio by weight of pigment to binder | 1.93 | 2.2 | 3.66 | 4.89 |
| Adjuvants details: | | | | |
| Tripolyphosphate 10% | 1.95 | 1.75 | 2.12 | 1.64 |
| $NH_4OH$ 20% | 0.14 | 0.13 | 0.09 | 0.07 |
| Bactericidal based on mercury | 0.63 | 0.58 | 0.56 | 0.44 |
| Hexylene glycol | 0.75 | 0.70 | 0.93 | 0.70 |
| Sodium carboxymethyl cellulose 3% solution | 19.47 | 21.64 | 20.00 | 27.34 |
| Water | 6.08 | 6.20 | 11.30 | 6.81 |
| Total | 29.00 | 31.00 | 33.00 | 37.00 |

EXAMPLE 3.—FORMULAS WITH A DISPERSION OF VINYL ACETATE-HOMOPOLYMERS

| | PVC 40% | | PVC 60% | |
| | Paint | | Paint | |
| | $CO_3Ca$ | $Al_2O_2$ | $CO_3Ca$ | $Al_2O_3$ |
|---|---|---|---|---|
| Rutile titanium oxide | 22 | 19.5 | 15 | 12 |
| Precipitated chalk, grain size 10μ | 14 | --------- | 28.5 | --------- |
| Alumina (above mentioned characteristics) | --------- | 18.5 | --------- | 34 |
| Dispersion with 60% dry extract | 32 | 28.5 | 19.5 | 15.5 |
| Adjuvants | 32 | 33.5 | 37 | 38.5 |
| | 100.00 | 100.00 | 100.00 | 100.00 |
| Ratio by weight of pigment to binder | 1.85 | 2.2 | 3.66 | 4.89 |
| Adjuvants details: | | | | |
| Tripolyphosphate 10% | 1.95 | 1.74 | 2.12 | 1.64 |
| $NH_4OH$ 20% | 0.14 | 0.13 | 0.07 | 0.05 |
| Bactericidal based on mercury | 0.65 | 0.58 | 0.56 | 0.44 |
| Hexylene glycol | 0.78 | 0.70 | 0.95 | 0.70 |
| Sodium carboxymethyl cellulose 3% solution | 19.52 | 18.70 | 19.90 | 24.40 |
| Water | 8.96 | 11.65 | 13.40 | 11.27 |
| Total | 32.00 | 33.50 | 37.00 | 38.50 |

EXAMPLE 4.—FORMULAS WITH A DISPERSION OF STYRENE-BUDATIENE COPOLYMERS

| | PVC 40% | | PVC 60% | |
| | Paint | | Paint | |
| | $CO_3Ca$ | $Al_2O_3$ | $CO_3Ca$ | $Al_2O_3$ |
|---|---|---|---|---|
| Rutile titanium oxide | 22 | 19.5 | 15 | 12 |
| Precipitated chalk grain size 10μ | 14 | --------- | 28.5 | --------- |
| Alumina (above mentioned characteristics) | --------- | 18.5 | --------- | 34 |
| Dispersion with 48% dry extract | 40 | 35.5 | 24.5 | 19.5 |
| Adjuvants | 24 | 26.5 | 32 | 34.5 |
| | 100.00 | 100.00 | 100.00 | 100.00 |
| Ratio by weight of pigment to binder | 1.85 | 2.2 | 3.65 | 4.89 |
| Adjuvants details: | | | | |
| Tripolyphosphate 10% | 1.96 | 1.74 | 2.10 | 1.64 |
| $NH_4OH$ 20% | 0.16 | 0.14 | 0.09 | 0.07 |
| Bactericidal based on mercury | 0.65 | 0.58 | 0.55 | 0.44 |
| Hexylene glycol | 0.78 | 0.70 | 0.92 | 0.70 |
| Sodium carboxymethyl cellulose 3% solution | 19.56 | 16.28 | 20.02 | 19.75 |
| Water | 0.89 | 7.06 | 8.32 | 11.9 |
| Total | 24.00 | 26.50 | 32.00 | 34.50 |

With paint compositions of the foregoing examples, moist abrasion strength tests were conducted with "Rel" test apparatus, such as is marketed by Research Equipment Ltd. The paint compositions were applied on agglomerated wood fiber plates onto a black base coat based on polyvinyl acetate except that paint compositions which are based on styrene-butadiene copolymers were applied onto a base coat of a styrene polymer. For the rub test, use was made of a nylon brush mounted on a driving gear, the brush being applied under a load of 0.9 kg. and the wear characteristics are indicated by the number of strokes before film wear is observed.

The following table sets forth the results that were secured:

| Emulsion | Charge | PVC 40% | PVC 60% |
|---|---|---|---|
| Vinyl acetate maleic esters copolymer. | Precipated chalk | [1] 500 | [1] 100 |
|  | Alumina | [2] 2,000 | [2] 2,000 |
| Vinyl acetate acrylic esters copolymers. | Precipitated chalk | [3] 1,500 | [4] 1,000 |
|  | Alumina | [2] 2,000 | [4] 1,500 |
| Vinyl acetate homopolymer. | Precipitated chalk | [2] 2,000 | [2] 2,000 |
|  | Alumina | [2] 2,000 | [2] 2,000 |
| Styrene butadiene copolymer. | Precipitated chalk | [4] 1,700 | [1] 1,200 |
|  | Alumina | [2] 2,000 | [1] 1,200 |

[1] Worn.
[2] Undamaged.
[3] Beginning of ray.
[4] Beginning of wear.

It will be apparent from the foregoing that alumina falling within the metes and bounds previously described can be employed effectively for the alumina in the foregoing examples and that other changes can be made from the standpoint of formulation and application without departing from the spirit of the invention, especially as defined in the following claims.

We claim:

1. In a paint composition formed of a binder base selected from the group consisting of drying oil and a polymeric material selected from the group consisting of homopolymers and copolymers of vinyl acetate, vinyl chloride, vinylidene chloride, acrylic and alkyl acrylic derivatives and styrene-butadiene copolymers, a transition alumina having less than 30% by weight alpha alumina, a specific area within the range of 20 to 250 m.$^2$/g., a microporosity determined by absorption of carbon tetrachloride within the range of 3 to 30 cm.$^3$ of carbon tetrachloride per 100 grams of alumina, and a grain size of less than 65 microns.

2. A paint composition as claimed in claim 1 in which the paint composition is in the form of a water emulsion.

3. A paint composition as claimed in claim 1 in which the alpha alumina is present in an amount less than 20% by weight of the alumina.

4. A paint composition as claimed in claim 1 in which the alumina has a grain size of less than 20 microns.

5. A paint composition as claimed in claim 1 in which the alumina is coated with an oleophilic material selected from the group consisting of stearic acid, oleic acid and naphthenic acid.

6. A paint composition as claimed in claim 1 in which the alumina is coated with a hydrophilic material.

7. A paint composition as claimed in claim 1 in which the volume concentration of alumina in the paint composition is within the range of 20–70% by volume based upon the volume of pigment plus dry binder.

8. A paint composition as claimed in claim 7 in which the alumina in the paint composition is present within the range 40–60% by volume.

9. A paint composition as claimed in claim 1 in which the alumina is present in the paint composition in combination with a finely divided inorganic pigment.

10. A paint composition as claimed in claim 9 in which the inorganic pigment present in combination with the alumina is titanium dioxide.

References Cited

UNITED STATES PATENTS

| | | | |
|---|---|---|---|
| 2,892,730 | 6/1959 | Kloepfer et al. | 106—193 |
| 3,025,179 | 3/1962 | Holbein | 106—300 |
| 3,055,736 | 9/1962 | Becue | 23—141 |
| 3,268,295 | 8/1966 | Armbrust et al. | 23—141 |
| 3,287,290 | 11/1966 | Bray | 260—17 |
| 3,318,714 | 5/1967 | Coney et al. | 106—193 |

DONALD E. CZAJA, *Primary Examiner.*

J. A. SEIDLECK, *Examiner.*

R. A. WHITE, *Assistant Examiner.*